United States Patent Office 3,850,910
Patented Nov. 26, 1974

3,850,910
PROCESS FOR THE RECOVERY OF PURE
ε-CAPROLACTAM
Reijer Goettsch, Beek, Limburg, and Herman M. A. Vos, Urmond, Netherlands, assignors to Stamicarbon N.V., Heerlen, Netherlands
Filed Oct. 30, 1972, Ser. No. 301,726
Claims priority, application Netherlands, Oct. 29, 1971, 7114904; Aug. 25, 1972, 7211586
Int. Cl. C07d 41/06
U.S. Cl. 260—239.3 A          6 Claims

ABSTRACT OF THE DISCLOSURE

The invention relates to the recovery of pure lactams, notably of ε-caprolactam. It is known that lactams can be formed by intramolecular rearrangement, the so-called Beckmann rearrangement, from alicyclic oximes with the aid of an acid catalyst, such as sulphuric acid, oleum or $SO_3$. To enable the lactam formed to be separated from the acid reaction medium, it is customary in the recovery of ε-caprolactam to neutralize said medium with aqueous ammonia until a supernatant layer of crude lactam in water—the so-called "lactam oil"—and a bottom layer, consisting mainly of an aqueous ammonium sulphate solution, are formed. The crude lactam oil is separated from the aqueous ammonium sulphate solution, and the ε-caprolactam is extracted for further purification from the lactam oil with a water-immiscible solvent, e.g. with benzene; the lactam contained in said organic solution is then re-extracted with water, whereupon the approximately 30% solution of lactam in water is usually subjected to a purification treatment with cation and anion exchangers for removal of organic impurities, and finally evaporated.

---

Figure 1:
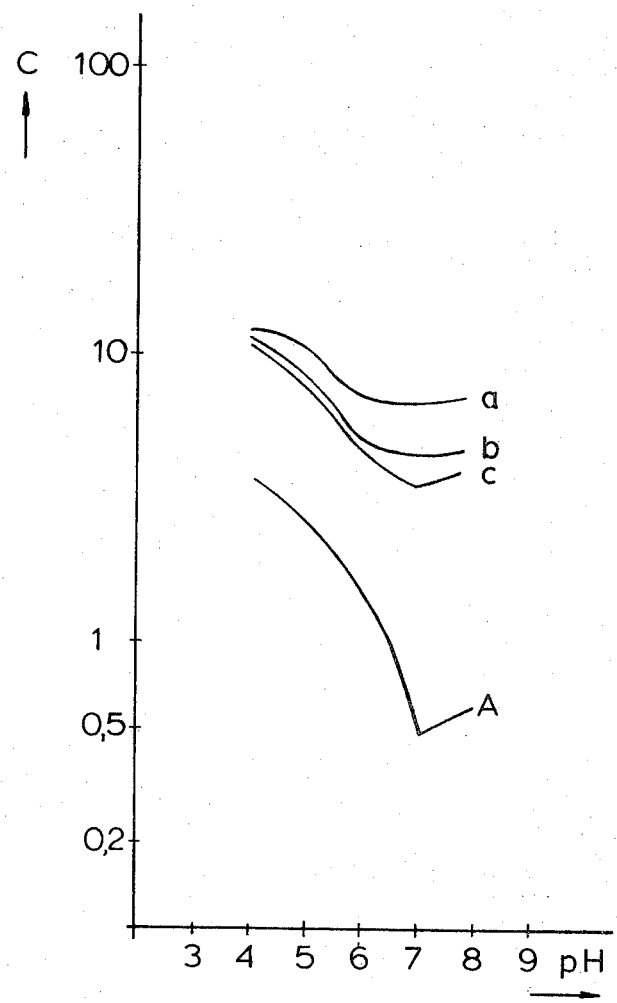

The lactam recovered in this way satisfies high purity demands; prior to the treatment with ion exchangers the acidity and alkalinity come in the order of 2–5 meq. per kg. of lactam, whereas after the treatment with ion exchangers these figures are guaranteed not to exceed 0.1 meq. per kg. However, the recovery procedure outlined above has the drawback that, to achieve recovery of the crude lactam oil, the sulphuric acid in the reaction mixture must be eliminated as ammonium sulphate, with the consequence that a large quantity of ammonium sulphate is formed as by product.

A search has already been made for techniques enabling the lactam to be recovered from the sulphuric acid reaction medium without it being necessary to convert all of the free acid into ammonium sulphate. This is achieved either by diluting the reaction medium with water, or by converting the sulphuric acid into ammonium hydrogen sulphate by addition of aqueous ammonia or ammonium sulphate, and subsequently extracting the lactam from the still strongly acid medium by means of a suited, water immiscible organic solvent.

Solvents suited for the purpose are chloroform, and other chlorinated hydrocarbons such as a 1-2-dichloroethane or 1,1,2,2-tetrachloroethane.

The lactam-loaded extraction agent, however, always contains free sulphuric acid to an extent, which, depending on the lactam concentration, may vary between 500 and 2000 meq. per kg. of lactam. If it should be desired now—in analogy with the known recovery technique—to reextract the lactam in the usual way from the organic solution by means of water and subject the aqueous lactam solution to a subsequent after-purification with cation and anion exchangers, it appears that the amount of free sulphuric acid in the aqueous solution to be purified is much too large to enable said purification with ion exchangers to be carried out in economic manner.

It has now been found that the solution of lactam in the organic solvent can be easily freed of so much of the sulphuric acid that reextraction with water again yields an aqueous lactam solution with less than 5 meq. of ionogenic constituents per kg. of lactam. If desired, such a solution can then be further purified in the usual way with cation and anion exchangers.

According to the invention an aqueous solution of caprolactam with less than 5 meq. of ionogenic constituents is obtained by neutralizing the sulphuric acid present in the solution of the lactam in the organic solvent, with simultaneous stirring, by means of aqueous ammonia until the pH (measured at 20° C.) is at least 4.5, in which treatment first an emulsion is formed of a 15–40% wt. aqueous ammonium sulphate solution in the solution of the lactam in the organic solvent as the continuous phase, whereupon said emulsion is allowed to settle, with formation of a supernatant aqueous phase and a heavier organic phase, which two layers can be separated in a simple manner, e.g. by decantation or centrifugation.

Notwithstanding this separation, the organic phase thus obtained still contains a residue of emulsified aqueous salt solution which, owing to the low interfacial tension between the two phases, cannot readily be separated by means of a coalescing filter mass under the influence of which the water phase droplets would have to coalesce.

In order to remove also this residue of the emulsified aqueous salt solution as thoroughly as possible, the organic phase is subjected to an after-washing treatment with demineralized water in a weight ratio of approximately 4–20 parts, preferably 8–10 parts of organic phase per 1 part of water, in which treatment—carried out with simultaneous stirring—first an emulsion is formed of water in the organic phase (lactam+solvent), which is then allowed to divide again into two layers, that can be separated in a simple manner.

In this way a lactam solution in the organic solvent is obtained which contains only 3–5 meq. of ammonium sulphate per 1 kg. of dissolved lactam.

The ammonium-sulphate content can be even further reduced, viz. to values in the order of less than 2 meq. per kg. of lactam, if the free sulphuric acid in the original lactam solution extracted from the acid reaction mixture is neutralized with aqueous ammonia to a pH of 7–9, i.e. if the organic solution is neutralized further than the pH of 4.5 that would have been needed for the formation of ammonium sulphate.

Upon removal of the aqueous phase containing ammonium sulphate and the treatment with demineralized water, there remains a lactam solution with less than 2 meq. of ammonium sulphate per kg. of lactam. Under optimum conditions, the content can even be brought down to 0.5 meq. per kg. of lactam.

The invention will now be elucidated with reference to a few experimental results obtained by neutralizing caprolactam-chloroform mixtures containing free acid with the aid of aqueous ammonia, and further treating them in the way indicated above. These experiments were all carried out with a 25%-solution of ε-caprolactam in chloroform which, in addition to caprolactam contained 2.06% wt. of sulphuric acid plus 1.6% of water.

Portions of 100 g. were mixed with aqueous ammonia, and thus neutralized to pH values of 4, 5, 6, 7 and 8.

The concentration of the aqueous ammonia used was so selected that after separation of the chloroform layer, the ammonium-sulphate concentration in the aqueous phase was 20% wt. in the first series of experiments, 27.5% wt. in the second series, and 35% wt. in the third.

In all experiments the aqueous ammonia also contained such an amount of caprolactam that, after neutralization during the separation into an ammonium-sulphate containing aqueous layer and a caprolactam-containing chloroform layer, the capro-concentration in the chloroform layer was equal to the original concentration.

After the separation, the content of ammonium sulphate left in the organic phase was determined and expressed in meq. of ammonium sulphate per kg. of lactam. Further, attention was given in these experiments to the influence of the de-mixing time, or settling time, on the content of ammonium sulphate left in the organic phase; to this end, settling times of 5, 8 and 12 minutes were used.

The isolated chloroform layer was then remixed with 10 grams of an appr. 15% wt. caprolactam solution, whereupon, after separation of the phases, the content of the remaining ammonium sulphate was measured again.

The following numerical example serves to give idea of the compositions of the various solutions. 100 g. of the acid caprolactam solution was neutralized, with simultaneous stirring, to a pH of 7.0 by addition of aqueous ammonia having the following composition:

6.0% wt. of $NH_3$,
2.5% wt. of caprolactam,
91.5% wt. of $H_2O$.

After a settling time of 5 minutes, samples were taken of the aqueous and organic phases.

The composition of the aqueous phase was as follows:

20.0% wt. of $(NH_4)_2SO_4$,
2.2% wt. of caprolactam,
77.8% wt. of $H_2O$.

The organic phase consisted of:

Caprolactam, 25 g.
$H_2O$, 1.65 g.
Chloroform, 71.29 g.
$(NH_4)_2SO_4$, 0.01155 g., corresponding to 7 meq. per kg. of caprolactam.

This organic phase was mixed with a solution of 1.5 g. of caprolactam in 8.5 g. of water. The organic layer formed after a settling time of 5 minutes consisted of Caprolactam, 25.0 g.
$H_2O$, 1.65 g.
Chloroform, 71.29 g.
$(NH_4)_2SO_4$, 0.00082 g., corresponding to 0.5 meq. per kg. of caprolactam.

The measuring results of the test series are listed in table A.

TABLE A

Content of ammonium sulphate left behind (meq./kg. of caprolactum)

| pH | After settling times of— | | | After re-washing and settling for— | | |
|---|---|---|---|---|---|---|
| | 5 min. | 8 min. | 12 min. | 5 min. | 8 min. | 12 min. |
| Series 1: | | | | | | |
| 4 | 12.5 | 11.2 | 11.0 | 3.8 | | |
| 5 | 11.0 | 8.5 | 7.8 | 2.7 | | |
| 6 | 7.4 | 5.0 | 4.6 | 1.6 | | |
| 7 | 7.0 | 4.6 | 3.6 | 0.5 | | |
| 8 | 7.5 | 4.8 | 4.2 | 0.6 | | |
| Series 2: | | | | | | |
| 4 | 16.1 | 14.5 | 13.3 | 5.3 | | |
| 5 | 15.9 | 10.9 | 10.2 | 3.6 | | |
| 6 | 13.3 | 9.0 | 7.8 | 2.1 | | |
| 7 | 11.0 | 7.4 | 5.6 | 1.0 | | |
| 8 | 13.0 | 8.5 | 8.0 | 1.2 | | |
| Series 3: | | | | | | |
| 4 | 34.0 | 26.5 | 24.5 | 5.5 | | |
| 5 | 21.5 | 17.6 | 16.3 | 3.9 | | |
| 6 | 20.0 | 13.0 | 12.4 | 2.8 | | |
| 7 | 18.5 | 12.3 | 10.0 | 1.4 | | |
| 8 | 23.0 | 13.6 | 11.3 | 1.7 | | |

Figure 2:
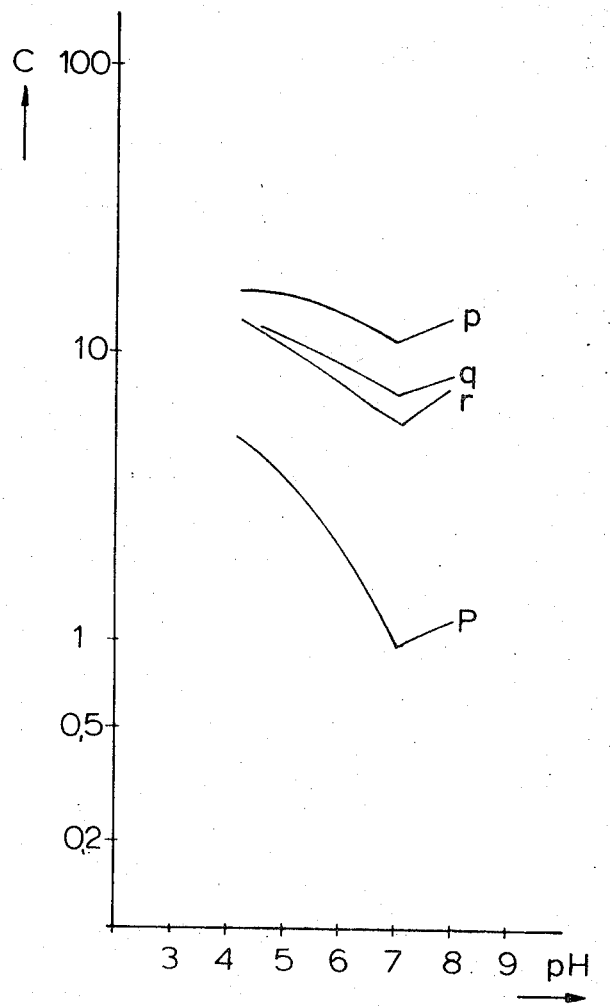
Figure 3:
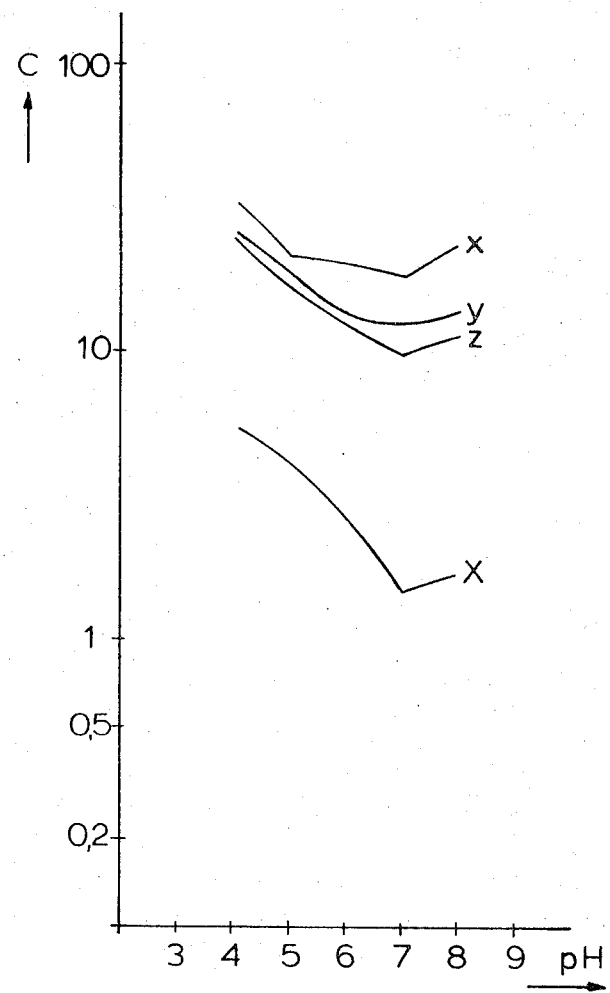

The above measuring results are also illustrated in FIGS. 1, 2 and 3 where the pH is plotted on the abscissa, and the concentration C in meq. of residual salt per kg. of lactam—plotted on a logarithmic scale—is indicated on the ordinate. FIG. 1 relates to test series 1. The lines $a$, $b$ and $c$ show the change in concentration C with increasing pH, with line $a$ relating to a settling time of 5 min., line $b$ to a settling time of 8 min. and line $c$ to a settling time of 12 min., while line A relates to the re-washed solution of caprolactam in the solvent.

In FIGS. 2 and 3, which represent the results of the test series 2 and 3, respectively, the lines are marked in conformity with FIG. 1 by the letter combinations $p$, $q$ $r$ and P, and $x$, $y$ $z$ and X resp.

It is evident from these measuring results that neutralization to a pH of 7 leaves a minimum content of residual salt in the solution of the lactam in the organic extraction agent.

This holds not only when chloroform is used as the extraction agent, but also when the extraction of lactam from a lactam-sulphuric acid mixture is carried out with other suitable water-immiscible agents, provided said agents possess a low surface tension relative to water. This condition is satisfied by e.g. benzene, toluene, and chlorinated hydrocarbons, like 1,2-dichloroethane and 1,1,2,2-tetrachloroethane.

Figure 4:
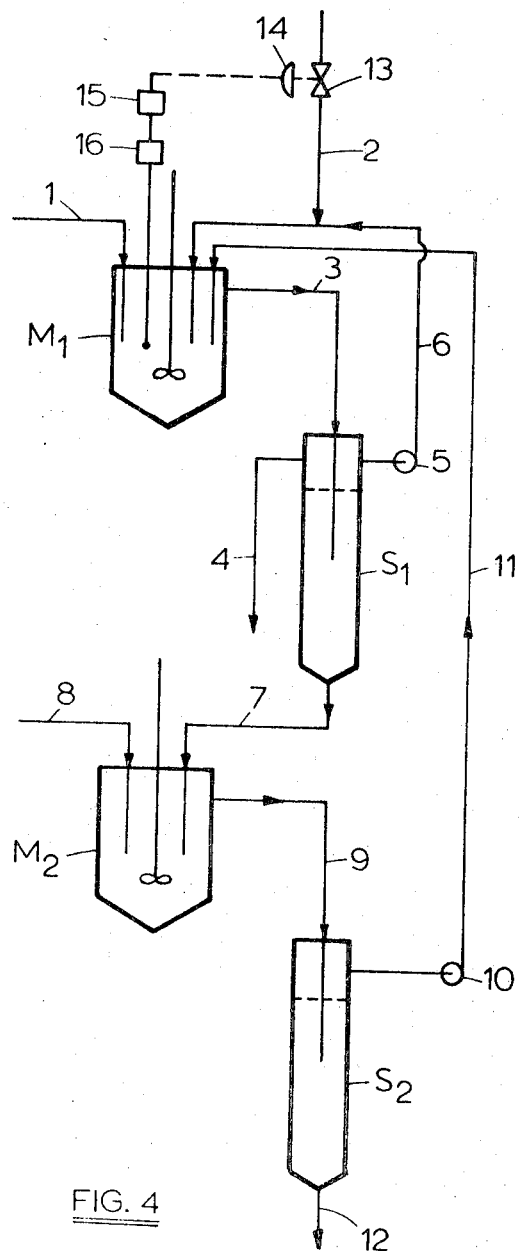
Figure 5:
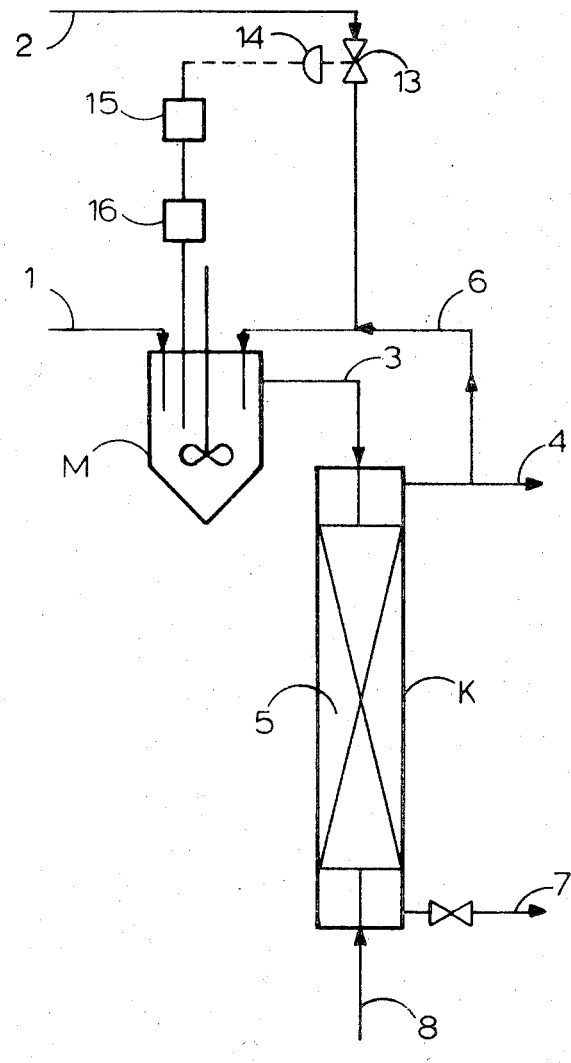

The abovementioned experiments relate to a discontinuous process of washing the organic phase. In practice, however, preference will be given to a continuous washing treatment. Modes of realizing a continuous process are schematically illustrated in FIGS. 4 and 5. In FIG. 4 $M_1$ and $M_2$ denote stirred mixing vessels, $S_1$ and $S_2$ being liquid-liquid separators. A solution of caprolactam in a water-immiscible organic solvent which still contains some free sulphuric acid is fed to mixing vessel $M_1$ along a line 1; said solution is neutralized with aqueous ammonia of 25% wt. concentration supplied via line 2. This aqueous ammonia is diluted with water recycled via line 6.

Feedline 2 for the aqueous ammonia is provided with a control valve 13, the position of which can be varied by a servomotor 14 operated by pulses received from a controller 15. Controller 15 is governed by a pH meter 16, with which the pH of the solution present in mixing vessel $M_1$ is measured.

A solution neutralized in mixing vessel $M_1$ flows via an overflow line 3 into separator $S_1$, where a separation is effected into a bottom layer consisting of the organic phase and a supernatant layer consisting of an aqueous solution of ammonium sulphate. Said aqueous solution is largely discharged along line 4, the remainder being recycled to mixing vessel 1 via pump 5 and line 6.

Line 7 feeds the organic phase from separator $S_1$ to mixing vessel $M_2$. Further, water is admitted via line 8. The mixture flows through an overflow line 9 into separator $S_2$, where a second separation is effected into an organic phase (the bottom layer) and an aqueous phase (the supernatant layer). This supernatant layer is delivered to mixing vessel 1 by pump 10 and line 11, while the purified lactam solution is withdrawn from the base of separator $S_2$ along line 12.

If in this continuous process a quantity of, say, 100 kgs. of a 25% wt. solution of lactam in chloroform, which also contains 2% wt. of sulphuric acid, is supplied along line 1, one has to supply appr. 2.8 kgs. of aqueous ammonia of 25% wt. concentration along line 2 plus approximately 8.7 kgs. of washing water along line 8, in order to obtain 13.5 kgs. of a 20% wt. ammonium-sulphate solution with a pH of 7 from line 4 and a purified lactam solution with less than 2 meq. of ammonium sulphate per kg. of lactam from line 12, which latter solution may then, optionally, be further purified in a cation and anion-exchanger battery (not shown in the drawing).

According to the mode of realization shown in FIG. 4, the emulsion formed during the neutralization in mixing vessel $M_1$ is first subjected to a phase separation in separator $S_1$, whereupon the organic phase separated off is re-washed with water in mixing vessel $M_2$ with formation of a new emulsion the phase separation of which takes place in separator $S_2$. This means in fact that the initially formed emulsion is washed with a counterflow of water, and separated by means of two separators and an interconected mixing vessel. However, counterflow-washing and separating the emulsion may also be done in a different type of equipment used for that purpose, e.g. in scrubbers whether or not packed with filling bodies, or in RDC extraction columns.

The washing treatment is preferably carried out in pulsed scrubbers at a pulsation rate of 1–3 cm./sec.

The packing to be used in the scrubbers may consist of filling bodies made of the usual materials.

Although a hydrophobic material like teflon or carbon might seem preferable, because of the disperse distribution of the small quantity of the water phase in the much larger volume of the organic phase, it appears that the much cheaper ceramic material is also very suitable because, notwithstanding the hydrophilic properties of said ceramic material, the water phase remains in the disperse state.

The relatively large difference in density between the continuous organic phase and the disperse water phase enables the column load in respect of the organic phase to be raised to a relatively high value, in the order of 0.5–1 cm./sec. A mode in which such a continuous process can be carried out is schematically illustrated in FIG. 5.

In FIG. 5 M denotes a stirred mixing vessel, K a scrubber packed with filling bodies. A solution of caprolactam in a water-immiscible organic solvent which still contains some free sulphuric acid is fed to mixing vessel M along a line 1; said solution is neutralized with aqueous ammonia of 25% wt. concentration supplied via line 2. This aqueous ammonia is diluted with water recycled via line 6.

Feedline 2 for the aqueous ammonia is provided with a control valve 13, the position of which can be varied by a servomotor 14 operated by pulses received from a controller 15. Controller 15 is governed by a pH meter 16 with which the pH of the solution present in mixing vessel M is measured.

A solution neutralized in mixer M flows along an overflow line 3 into the packed scrubber K, where the emulsion is washed with a counterflow of demineralized water supplied via line 8.

A purified solution of lactam in the organic solvent is carried off via a line 7 provided with a control valve; correct adjustment of the control valve by means of a level controller makes it possible that a distinct separation into an aqueous phase and an organic phase takes place in the top of column K, with the boundary between the two phases being situated just over the filling bodies in column K.

The washing water loaded with ionogenic substances and also containing some lactam leaves the system along line 4. To prevent loss of lactam, this washing water can be conveniently used for diluting the lactam-sulphuric acid mixture to be extracted, which means that this lactam is, as it were, kept in recirculation.

In this continuous realization of the process it has appeared that, to recover a lactam solution with less than 0.2 meq. of $(NH_4)_2SO_4$/kg. of lactam, the neutralization of the free acid in the solution of lactam in the organic phase has to be continued to above a pH of 7, viz. to a pH of 8–9, as is illustrated by the figures listed in table B.

TABLE B

| Emulsion discharged via conduit 3, pH | Solution discharged via conduit 7, pH | meq. $(NH_4)_2SO_4$/kg. lactam |
|---|---|---|
| 4.5 | 3.6 | 4.6 |
| 5.6 | 4.5 | 2.4 |
| 6.2 | 4.8 | 1.8 |
| 8.0 | 6.7 | 0.46 |
| 8.2 | 7.1 | 0.18 |
| 9.4 | 7.5 | 1.7 |

Figure 6:
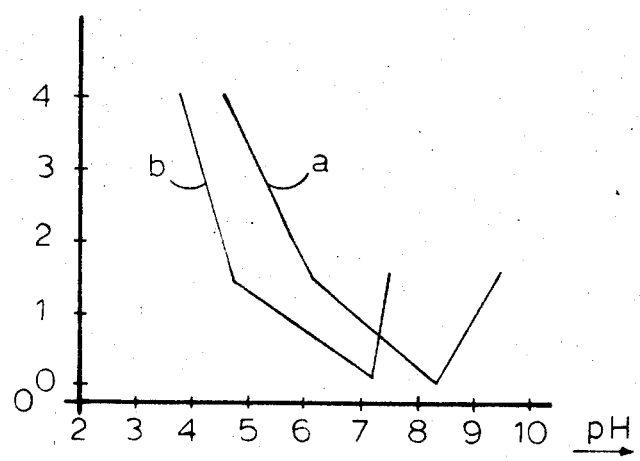

The above measuring results are graphically represented in FIG. 6 where the content of meq. $(NH_4)_2SO_4$ in the purified solution has been plotted versus the pH both for the liquid flow discharged via conduit 3 (line a) and for that leaving along conduit 7 (line b).

To elucidate the process according to the invention, table C gives the quantities and compositions (per 1000 kgs. of caprolactam) of the mass flows involved in the process.

The numbers of the mass flows correspond to the reference numbers of the conduits through which the flows are passed.

TABLE C

| Flow No. | Composition in kg. | | | | | | |
|---|---|---|---|---|---|---|---|
| | Lactam | $H_2SO_4$ | $(NH_4)_2SO_4$ | $NH_3$ | $H_2O$ | $CHCl_3$ | Total |
| 1 | 1,013 | 84 | | | 68 | 2,886 | 4,051 |
| 2 | | | | 29 | 87 | | 116 |
| 3 | 1,019 | | 169 | | 393 | 2,886 | 4,467 |
| 4 | 13 | | 113 | | 482 | | 608 |
| 6 | 6 | | | 56 | 238 | | 300 |
| 7 | 1,000 | | | | 68 | 2,886 | 3,954 |
| 8 | | | | | 395 | | 395 |

What is claimed is:

1. In a process for the recovery of pure ε-caprolactam containing less than 5 meq. of ionogenic substances per kg. of lactam, obtained by intramolecular conversion of cyclohexanone oxime with the aid of an acid catalyst from the group consisting of sulphuric acid, oleum and sulphur trioxide, and extraction of the reaction mixture after dilution with water and, optionally after partial neutralization of the sulphuric acid, with a water-immiscible organic solvent for the lactam, the improvement comprising neutralizing the resulting solution of lactam in the organic solvent with aqueous ammonia to a pH of at least 4.5 (measured at 20° C.), thereby forming an emulsion of an aqueous 15–40% wt. ammonium sulphate solution emulsified in the organic solvent, washing the emulsion with a counterflow of demineralized water in a weight ratio of 4–20 parts thereby reextracting the lactam from the organic solvent to produce an ε-caprolactam solution with less than 5 meq. of ionogenic substances per kg. of lactam, while the resulting aqueous lactam solution is evaporated, optionally after having been freed of organic ionogenic compounds on cation and anion exchangers.

2. The process according to claim 1, wherein the solution of lactam in the organic solvent is neutralized with aqueous ammonia to a pH of 7–9.

3. The process according to claim 1 wherein the washing treatment is carried out according to the counterflow principle in a pulsed scrubber packed with filling bodies.

4. The process according to claim 1 wherein the weight ratio of emulsion to demineralized water is 8 to 10 parts of emulsion per part of demineralized water.

5. The process according to claim 3 wherein the pulsed scrubber is packed with ceramic filling bodies.

6. A process for the recovery of pure ε-caprolactam containing less than 5 meq. of ionogenic substances per kg. of lactam, said lactam produced by intramolecular conversion of cyclohexanone oxime in the presence of the acid catalyst sulfuric acid, oleum or sulfur trioxide, and extracting the reaction mixture with a water-immiscible organic solvent for the lactam, comprising neutralizing the acid catalyst contained in the solution of the lactam in the organic solvent by adding aqueous ammonia with stirring to the solution of lactam in the organic solvent until the pH of the solution is at least 4.5 (measured at 20° C.) thereby:

(1) forming an emulsion of an aqueous 15–40% by weight ammonium sulfate solution in the solution of lactam in the organic solvent as the continuous phase;
(2) allowing the emulsion to set, forming:
  (a) a supernatant aqueous layer and
  (b) a heavier organic phase;
(3) separating the organic layer (b) from the aqueous layer (a);
(4) washing the thus removed organic layer (b) with a counterflow of demineralized water in a weight ratio of 4–20 parts by weight of emulsion per 1 part by weight of demineralized water, thereby removing the residue of the emulsified aqueous salt solution from the organic phase forming an emulsion of water in the organic phase consisting of solvent plus $\epsilon$-caprolactam; and
(5) separating the organic solvent phase containing the $\epsilon$-caprolactam from the final emulsion of step (4) producing a solution having less than 5 meq. of ammonium sulfate per 1 kg. of dissolved lactam.

References Cited
UNITED STATES PATENTS

| | | | |
|---|---|---|---|
| 2,221,369 | 11/1940 | Cass | 260—239.3 A |
| 2,692,878 | 10/1954 | Kahr | 260—239.3 A |
| 2,737,511 | 3/1956 | Cohn | 260—239.3 A |
| 2,758,991 | 8/1956 | Kretzers et al. | 260—239.3 A |
| 2,817,661 | 12/1957 | Kampschmidt | 260—239.3 A |
| 2,828,307 | 3/1958 | Soeterbroek et al. | 260—239.3 A |
| 2,993,889 | 7/1961 | Muytjens et al. | 260—239.3 A |

HENRY R. JILES, Primary Examiner

R. T. BOND, Assistant Examiner